JOHN P. AREY.
Improvement in Furnaces for Roasting Ores.
No. 115,559.  Patented June 6, 1871.
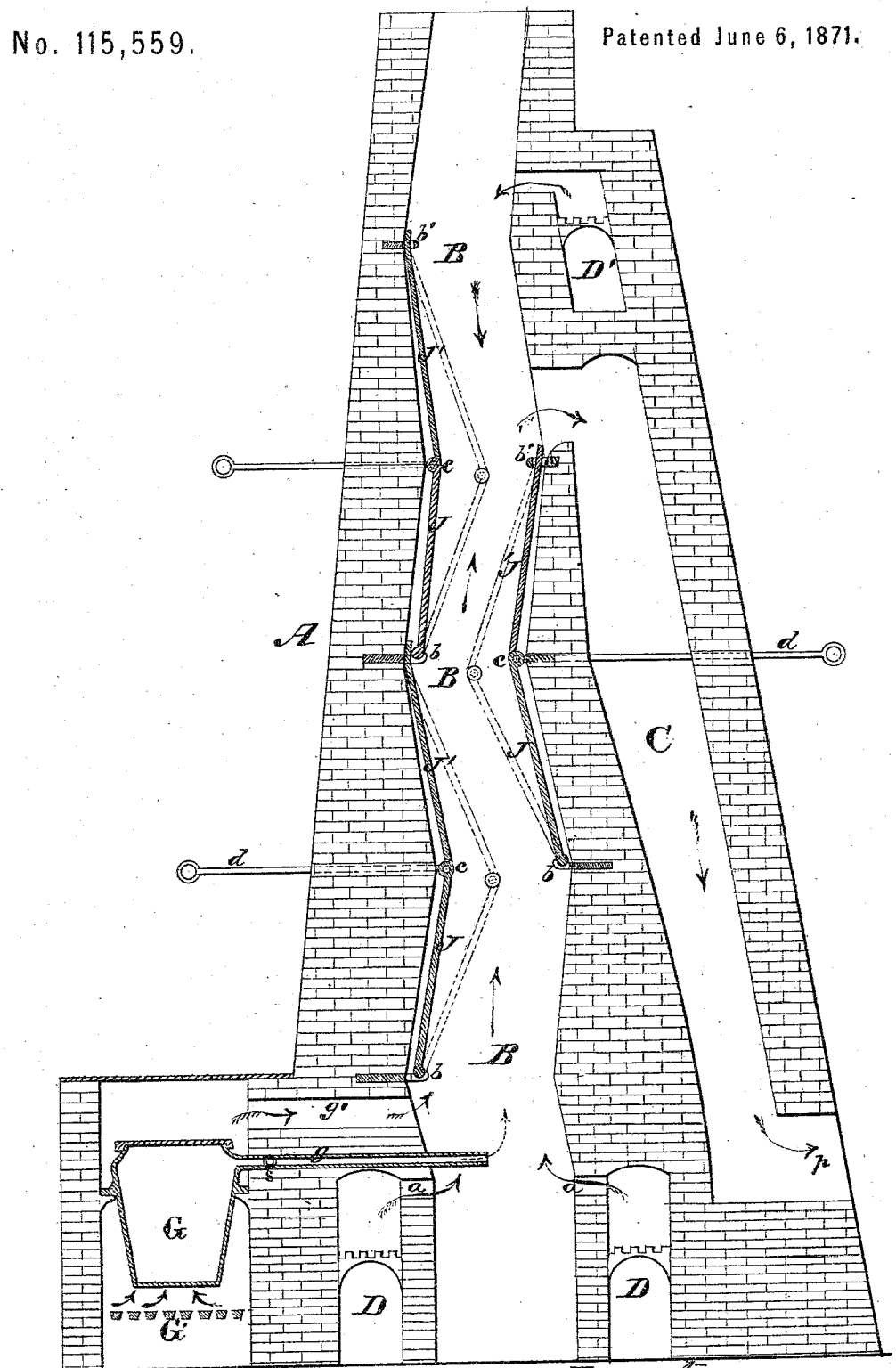

115,559

UNITED STATES PATENT OFFICE.

JOHN P. AREY, OF GEORGETOWN, COLORADO TERRITORY.

IMPROVEMENT IN FURNACES FOR ROASTING ORES.

Specification forming part of Letters Patent No. 115,559, dated June 6, 1871.

*To all whom it may concern:*

Be it known that I, JOHN P. AREY, of Georgetown, in the county of Clear Creek and Territory of Colorado, have invented certain Improvements in Furnaces for Roasting, Oxidizing, and Chloridizing Ores; and I do hereby declare that the following is a full, clear, and exact description thereof reference being had to the accompanying drawing, which represents a vertical section through a furnace having my improvements applied to it.

This invention relates to improvements which are applicable to the furnace for roasting ores described in the schedule annexed to my Letters Patent of the United States numbered 103,006, and dated on the 17th day of May, 1870. The object of the first part of my invention is to improve the shaft or stack of a roasting-furnace by the arrangement therein of hinged plates, and providing such plates with means which will allow them to be conveniently adjusted and set at different angles or planes, thereby obtaining a zigzag or serpentine passage in the shaft, which can be contracted or enlarged according to the condition of the ore under treatment, as will be hereinafter explained. The object of the second part of my invention is to chloridize the metals by subjecting them, while passing through the flue or flues of a roasting-furnace, to the action of chlorine gas, which is generated in a retort or in retorts suitably combined with the furnace, thereby obtaining greater economy of chloridizing material than is the case where such material is mixed in the solid form of the ore, as will be hereinafter explained.

The following description will enable others skilled in the art to understand it.

In the annexed drawing I have represented a furnace which in many respects resembles the furnace described and shown in my Letters Patent numbered 103,006, above referred to. I prefer to employ a furnace thus constructed in carrying out my invention; but I do not confine myself thereto.

A represents the shaft or stack of the furnace, through which rises in a serpentine manner a flue-space, B. At the base of this flue-space, and on opposite sides of the same, are the main fire-chambers D D, constructed with outlets $a\ a$, for the escape of the heated products into the flue B. Near the top of the stack, and communicating with the main flue B, is a secondary or oxidizing-furnace, D', the products from which, and also from the furnaces D D, pass off into a descending flue, C, and finally escape therefrom at $p$. The sides of the main flue B may be made zigzag, as shown, or they may be made straight or flat. I prefer to have this flue made of the zigzag form shown in the drawing, although it may be made straight and the zigzag form obtained in the following manner: On opposite sides of the flue B are hinged plates J J', which are supported in pairs upon lugs $b$, and connected together in pairs by hinges $e$. The upper end of each plate J' is received through a suitable guide, through which its upper end can slide freely. Each pair of plates J J' has connected at the points $e$ an adjusting-rod, $d$, which passes through the furnace-wall, as shown, and which should be provided with an adjusting-screw or some equivalent device which will securely hold the plates at any desired angle. It will be seen from the above description that the flue-space B can be contracted or enlarged according to the nature of the material which it is desired to treat in the furnace. The dotted lines in the drawing indicate the plates J J' adjusted so as to leave quite a narrow flue-space of a zigzag form between them, and at the points $c$, where the plates are hinged together. The full lines indicate the plates J J' adjusted against the masonry walls of the flue, so as to present the greatest possible space and less prominent angles at $c$. Thus the flue-space is adjustable according as it may be desired to subject the descending material a longer or shorter time to the action of the ascending heat and gases. The surfaces of the plates J J' may be coated with some suitable cement which will protect the plates from rapid destruction.

In the process heretofore practiced in chloridizing metallic substances in shaft-furnaces, the salt or other materials from which the chlorine was obtained, was either mixed intimately with the pulverized ore before the same was fed into the furnace, or was fed simultaneous with the ore, and the whole mixture being subjected to the heat of the furnace, the chlorine generated during the descent through the shaft of the furnace. This method is objectionable from the fact that it necessitates a great waste of salt, owing to the difficulty of determining the exact proportion of salt to use with a given amount of ore, or the per cent. of chlorine which will be evolved during the descent of the material through the furnace. To safely avoid any material loss of the precious metals an extra amount of chloridizing material is always used. To obviate these objections I manufacture the chlorine gas in a retort, G, arranged in a furnace, G', and inject the gas thus generated into the flue B at or near the bottom thereof by means of a pipe, $g$. The furnace G may have an outlet at $g'$ for conducting its products of combustion into the flue B. For the purpose of regulating the amount of chlorine gas which it is required to discharge into the flue B a valve, $s$, may be applied to the pipe $g$. In this way I introduce pure chlorine gas into the furnace-flue and bring it in contact with the descending stream of ore, and in this way a greater or lesser amount of gas can be employed, according to the requirements of the case, and there will be little or no waste.

I do not confine myself to the introduction of chlorine gas at the bottom of the flue B, as gas may be led into this flue as well as into the descending flue C, at different points. By admitting this gas into the flue C the fine metallic dust which escapes the action of the chlorine in the main flue B, and which is carried off by the strong draft, will be thoroughly chloridized.

I do not claim a furnace with a vertical shaft and stationary inclines, as shown in the patent of F. A. W. Partz, dated June 14, 1864, as such construction presents obstructions to the ascending currents, and besides does not admit of a variation of the size of the flue; neither do I claim a shaft-furnace such as is shown in Charles Stetefeldt's patent, dated December 31, 1867, as such furnace is not constructed with means for varying the size of the flue, nor is it constructed with a chlorine-gas generator and injector; neither do I claim furnaces constructed as described in patents of Henry Tindall, dated October 13, 1868, and of H. H. Eames, dated February 2, 1869, as in such furnaces powdered ore is not flowed down through a shaft and subjected in all of its particles to the ascending fumes of chlorine gas; but

I claim as new and desire to secure by Letters Patent—

1. The employment of adjustable plates in the shaft or stack of a roasting-furnace, whereby the flue-space can be contracted or enlarged and at the same time given a zigzag or serpentine form, substantially as described.

2. The combination of a chlorine-gas generator and injector, in combination with a roasting-furnace, through the stack of which the powdered ore falls, and in its fall is treated by fire and said chlorine gas, substantially as described.

JOHN P. AREY.

Witnesses:
J. N. CAMPBELL,
R. T. CAMPBELL.